May 9, 1961  K. GEBELE  2,983,207
FULLY AUTOMATIC PHOTOGRAPHIC CAMERA
Filed Sept. 1, 1959  3 Sheets-Sheet 2
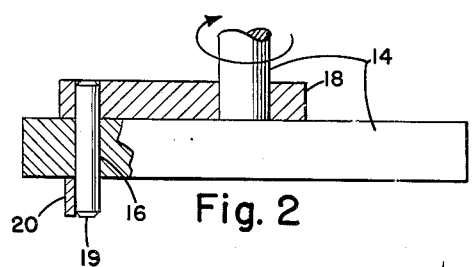
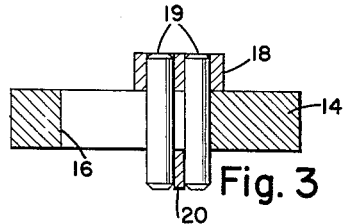
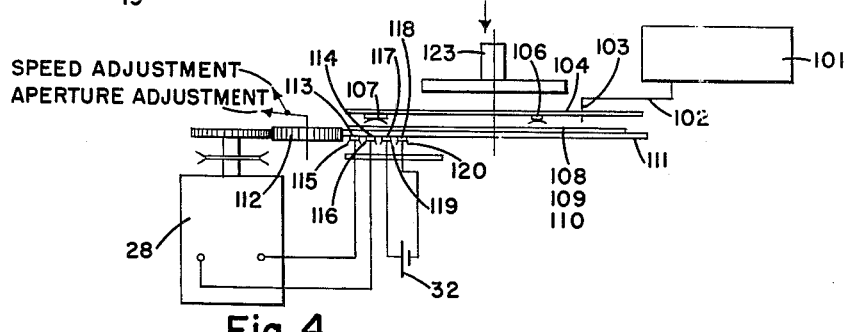
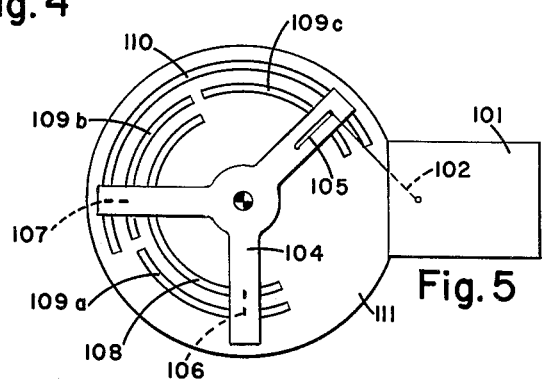
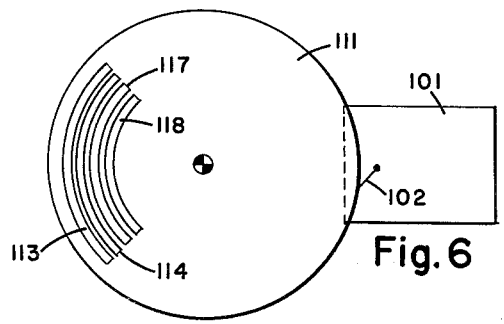

May 9, 1961  K. GEBELE  2,983,207
FULLY AUTOMATIC PHOTOGRAPHIC CAMERA
Filed Sept. 1, 1959  3 Sheets-Sheet 3

United States Patent Office

2,983,207
Patented May 9, 1961

2,983,207
FULLY AUTOMATIC PHOTOGRAPHIC CAMERA

Kurt Gebele, Munich, Germany, assignor to Compur-Werk Friedrich Deckel O.H.G., Munich, Germany, a firm of Germany Filed Sept. 1, 1959, Ser. No. 837,508

Claims priority, application Germany Sept. 4, 1958

2 Claims. (Cl. 95—10)

The present invention relates to a fully automatic photographic camera (especially a "still" camera) and, more particularly, to such a camera wherein an exposure value is set automatically on the shutter in accordance with the indication of an exposure value meter, the shutter is released, and then is automatically cocked and the film transported so that the camera is ready to take the next picture. These various operations are preferably performed sequentially by manually pressing a single control button or switch.

An object of the invention is to provide a generally improved and more satisfactory completely automatic photographic camera, especially of the "still" kind as distinguished from a motion picture camera.

Another object is the provision of a new and improved fully automatic camera wherein the shutter is automatically set by a motor-driven device to an exposure value in accordance with the indication of an exposure value meter, and wherein the shutter is automatically cocked simultaneously with the advancing of the film by a motor-driven device, both operations being actuated by a single motor.

Yet another object is the provision of an automatic camera of the type as specified in the foregoing object wherein the shutter is released automatically between the two operations, the sequence being fully automatic, if desired, or else wherein the sequence may be halted temporarily for further adjustment of the shutter before the shutter is released.

A further object is to provide a camera wherein a power device including a motor is provided for automatically and sequentially setting the shutter in accordance with an exposure value meter, releasing the shutter, and cocking the shutter and advancing the film, the device being so arranged as to be compact and to be provided as auxiliary equipment attachable to a present existing camera.

A still further object is the provision of an automatic still camera in which, for the sake of economy of space and weight, the same electric motor serves at one part of the operating cycle to cock or tension the shutter and to advance the film, and serves at another part of the operating cycle to shift the shutter speed control or the diaphragm aperture control or both, to set the speed and aperture to an exposure value indicated by a measuring instrument such as a light meter.

These and other desirable objects may be attained in the manner disclosed as an illustrative embodiment of the invention in the following description and in the accompanying drawings forming a part hereof, in which:

Fig. 2 is a section taken approximately on the line 2—2 of Fig. 1;

Fig. 3 is a section taken approximately on the line 3—3 of Fig. 1;

Fig. 4 is a diagrammatic side view of the exposure value setting control device, showing it on a larger scale and in greater detail than in Fig. 1;

Fig. 5 is a top plan view of certain parts shown in Fig. 4, with overlying parts removed for the sake of clarity;

Fig. 6 is a bottom plan view of certain of the parts shown in Fig. 4, with other parts omitted for the sake of clarity;

The same reference numerals throughout the several views indicate the same parts.

Figure 1:
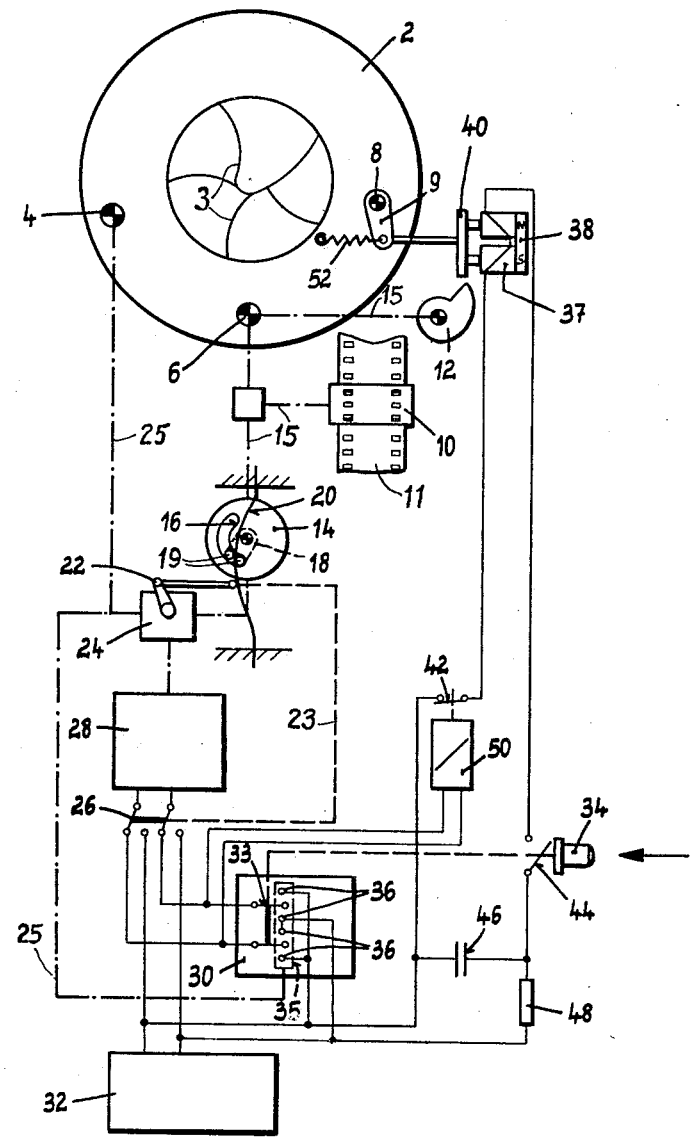
Fig. 1 is a schematic or diagrammatic view of a photographic camera according to the present invention, omitting many parts and showing, in general, only those parts helpful to an understanding of the present invention.

Reference will be made first to Fig. 1, which shows the general or over-all construction (quite diagrammatically or schematically) of a typical camera embodying the present invention, and when the construction as a whole has been described in connection with Fig. 1, further details will be explained in conjunction with other figures of the drawings.

The camera embodies, as usual, a shutter indicated at 2, preferably of the objective type, the exact details of which shutter are unimportant for purposes of the present invention. Preferably the shutter is one having blades 3 of the usual pivoted kind customarily found in objective shutters, normally in closed positions, and movable to open positions and then back to closed position, for making an exposure. The shutter preferably also has a shaft 4, rotation of which serves to adjust the exposure value for which the shutter is set; that is, to adjust the relationship of the diaphragm aperture to the shutter speed. Also the shutter preferably has a shaft 6, rotation of which serves to cock or tension the shutter ready for making an exposure, and another shaft 8, rotation of which serves to trip or trigger the shutter to make the exposure (after it has been properly cocked or tensioned).

Although the shutter may take many specific forms so far as the present invention is concerned, one form of shutter suitable for this purpose, so far as the cocking or tensioning operation and the releasing or triggering operation are concerned, is the shutter disclosed in the copending United States patent application of Kurt Gebele, Serial No. 509,929, filed May 20, 1955, and in the approximately corresponding British Patent 769,086, published February 27, 1957.

The cocking or tensioning shaft 6 of the present application may thus correspond to the cocking or tensioning shaft 14 in the copending application and in the British patent, while the release shaft or trigger shaft 8 of the present application may correspond to the shaft on which the finger piece 94 of the prior application and British patent is mounted (this shaft being indicated at 95 in the prior application) or to the shaft on which the latch 92 of the prior application is mounted (this shaft being indicated at 89 in the prior application, but unnumbered in the British patent) so that, in either event, partial rotation of the present shaft 8 in the proper direction will release the latch and allow the shutter to perform its exposure-making operation.

The shaft 4 of the present construction operates any suitable mechanism for adjusting the shutter speed control or the diaphragm aperture control, or both, to achieve a desired "exposure value," or relationship between shutter speed and diaphragm aperture regardless of the absolute value of either the shutter speed setting or the diaphragm aperture setting. The concept of an exposure value independent of the absolute value of either shutter speed or diaphragm aperture, is now well understood in the art, and is fully explained in various places in the literature, as for example in United States Patent 2,829,574, granted April 8, 1958, for an invention of Kurt Gebele. Conveniently this exposure value setting shaft 4 of the present construction may correspond to the exposure value setting shaft 140a, 140b in Fig. 4 of the drawings of the copending United States patent application of Kurt Gebele and Franz Singer, Serial No. 707,796, filed January 8, 1958, or the exposure value setting shaft 156a in Fig. 7 of the drawings of the same Gebele and Singer application.

The present camera also includes a conventional film transport device or film feeding device indicated diagrammatically at 10, to advance or transport the film 11 after each exposure, to bring a fresh area of the film into the focal plane of the camera, ready for the next exposure. There is also a trigger resetting cam 12, which will be further explained below. There is also a shift driving disk 14, the construction and operation of which will be further described below. The cocking shaft 6, the restoring cam 12, the film transport member 10, and the driving disk 14 are all operatively connected to each other to turn in unison, the connection being, for example, by means of appropriate shafts diagrammatically indicated by the dot-dash lines 15.

It may be said at this point that the dot-dash lines in Fig. 1 are intended as a diagrammatic representation of shafts, or other suitable mechanical transmission members, while the plain dash lines (without dots) indicate shifting connections for shifting one part simultaneously with another part, and many of the solid or unbroken lines indicate electrical circuit connections.

According to one aspect of the present invention, the camera is equipped with a single electric motor 28, powered by a suitable local source of electric current such as the battery 32, and functioning at one time to drive the members 6, 10, 12, and 14 without affecting the exposure value setting shaft 4, while functioning at another time to set the exposure value setting shaft 4 at a proper value without moving the members 6, 10, 12, and 14.

This is accomplished through the medium of a changeover coupling indicated diagrammatically at 24, and controlled by a shift lever 22. The changeover coupling is of any conventional known form, the details of which are unimportant for purposes of the present invention, and it has, as usual in mechanism of this type, one input shaft and two output shafts. When the shift lever 22 is in one position, e.g., in the left hand position shown in Fig. 1, the input shaft of the changeover coupling is operatively connected to one of the two output shafts, e.g., the output shaft which diagrammatically goes out the left end of the coupling mechanism 24. When the shifting lever 22 is shifted to its other position, e.g., its right hand position, then the input shaft of the coupling mechanism is disconnected from the first mentioned output shaft and is operatively connected to the second output shaft, e.g., the shaft which diagrammatically comes out the right end of the coupling mechanism 24.

The electric motor 28 is permanently connected to the input shaft of the coupling mechanism 24. One of the output shafts, e.g., the right hand one, is operatively connected to the above mentioned shafting 15 which controls or operates the disk 14, the restoring cam 12, the film transport member 10, and the shutter cocking or tensioning shaft 6. The other output shaft of the changeover coupling 24, e.g., the left hand output shaft, is operatively connected by the connection indicated diagrammatically at 25, to the exposure value setting shaft 4 of the shutter, and also to the exposure value control device indicated in general at 30 and further described in detail below. Thus it is seen that when the shifting lever 22 of the changeover coupling mechanism 24 is in its left hand position as illustrated in Fig. 1, the driving motor 28 is operatively connected to the exposure value setting shaft 4 of the shutter and to the exposure value control device 30. When the shifting lever 22 is in the other or right hand position, the driving motor 28 is disconnected from the parts 4 and 30 (which remain operatively connected to each other, however) and is operatively connected to the shafts 15 which operate the parts 6, 10, 12, and 14.

The shifting of the changeover coupling from one position to the other is accomplished by rotation of the driving disk 14, in the following manner: The driving disk 14 is fixed to the shaft 15, to turn therewith, and has an arcuate slot 16. A shift fork 18 is freely rotatable on the shaft 15, and carries a claw in the form of two pins 19 parallel with each other and slightly spaced from each other, which pass through the arcuate slot 16 and, on the opposite face of the disk 14, embrace a leaf spring member so designed as to have a fast snap action in either direction when moved past its dead center position. This leaf spring member 20 is connected by a rod to the shift lever 22 of the changeover coupling 24, and is also connected by the operative connection indicated diagrammatically at 23 to the changeover switch 26, which will be further described below. The spring rocker 20 normally buckles toward either extreme position, and will not stay in an intermediate position.

Those familiar with British Patent 769,086 and with the corresponding United States application 509,929, will realize that when the cocking or tensioning shaft 14 in said patent and application (corresponding to the cocking shaft 6 of the present application) is rotated to tension the shutter ready for an exposure, this shaft remains in its tensioned position until the shutter is tripped or triggered to make the exposure. Then when the shutter is triggered or released, the shaft 14 (or 6, in the present application) rotates in a reverse direction from its tensioned position to its run-down or rest position. Thus the corresponding turning movement of the driving disk 14, in one direction during the tensioning of the shutter and in the opposite direction during the running down of the shutter when an exposure is made, can be relied upon to shift the member 20 and thus to shift the members 22 and 26, in one direction or the other at the end of the respective rotary movements which occur during tensioning or cocking the shutter and during the running down or exposure operation of the shutter.

The parts are illustrated in Fig. 1 at the conclusion of of a shutter tensioning or cocking operation, and ready for the commencement of the exposure value setting operation, which immediately precedes the making of the exposure. Let us assume, for the moment, that the exposure value setting operation is now accomplished and that an exposure is made, although the way in which this is done will not be described until later. As the exposure is made, the shaft 6 turns back in a reverse direction for the reasons already explained above, carrying the driving disk 14 in a reverse or counterclockwise direction from the position shown in Fig. 1. As this reverse rotation continues, it will at first have no effect on the member 20, because of the lost motion provided by the length of the arcuate slot 16. But just before the end of the running down motion of the shaft 6, the disk 14 will have turned far enough so that the end of the arcuate slot 16 comes into contact with the shifting fork claw 18, 19, and moves this claw so as to displace the spring member 20 from the position shown in Fig. 1 to a position just beyond its dead center position, whereupon the resilience of the member 20 will carry it further to the right from its dead center position, and will, with a quick snap action, move the shifting lever 22 of the changeover coupling 24 from the position illustrated to the opposite or right hand position, and simultaneously (through the connection 23) will move the double pole double throw switch 26 to the opposite position from that illustrated in Fig. 1.

This shifting of the switch 26 will immediately connect the driving motor 28 directly to the battery 32, so that the driving motor will now begin to run, without any action on the part of the operator of the camera. Because the changeover coupling 24 has been shifted as just mentioned above, the motor will now be operatively connected to the shafts 15, 6 and the operation of the motor will serve to turn the shaft 6 in a shutter cocking or tensioning direction, and at the same time will serve to advance or transport the film 11 by means of the film advancing mechanism 10, and also will operate the trigger restoring cam 12 in a manner further described below. Thus in a fully automatic manner, and without any attention whatever on the part of the operator, the shutter tensioning and film advancing operations are immediately performed at the conclusion of each exposure, making the camera instantly ready for the next exposure.

As the shafts 15, 6 reach the end or limit of their rotation in a tensioning direction, the driving disk 14 swings around to a position where the trailing end of the slot 16 engages the pins 19 of the shifting claw, and now moves the spring member 20 back past its dead center position, in a leftward direction. The spring 20 then produces a snap action shifting the changeover coupling 24 leftwardly and simultaneously shifting the double pole double throw switch 26 leftwardly to the position illustrated in Fig. 1. The shifting of the arm 22 disconnects the motor operatively from the shafts 15, 6, and operatively connects the motor to the shafts 25, 4. But at the same time, the operation of the motor stops, because the shifting of the switch 26 disconnects the motor from the direct connection with the battery 32, and establishes a connection to the battery only through the control device 30, which is now in a position where the electrical connection is broken or ineffective, as will be understood when the control device 30 is further explained in detail below.

This control device 30 comprises, in general, a rotary double pole changeover switch 33 engageable with arcuate slide contacts schematically indicated at 36 on a rotary contact disk 35 operatively connected by the shaft 25 to the exposure value setting shaft 4 of the shutter, to turn therewith. The disk 35 and shaft 4 are both driven simultaneously by the motor 28 when the changeover coupling 24 is in its left hand position. A speed reduction gear is operatively interposed between the motor 28 and the changeover coupling 24, and the latter is preferably developed as a safety coupling, i.e., capable of slipping if unusual resistance is encountered.

The rotary position of the changeover switch 33 is controlled by a photoelectric exposure meter, and at the moment of operation it is clamped fast by movement of the manual pushbutton 34, which brings the contacts of the switch member 33 into engagement with the arcuate contacts 36 on the disk 35, in a position of relative orientation thus determined in part by the exposure meter and in part by the then existing position of the exposure value setting shaft 4. Thereby current is supplied to the motor 28, in a polarity determined by the relative orientation of the parts 33 and 35, so that the motor drives the shaft 4 and the disk 35 in the required direction to effectuate the setting of the shaft 4 to an exposure value determined by the exposure meter. During this exposure value setting movement, the rotation of the disk 35 pulls the arcuate contacts 36 along under and in contact with the now stationary contact members of the switch 33, until a predetermined position of orientation is reached in which insulated parts on the disk 35 come under the contacts of the switch 33, thereby stopping the flow of current to the motor and stopping the rotation of the shaft 4 in a position corresponding to the desired exposure value.

The foregoing is obviously only a very brief description of the control device 30 in general terms, to enable one to understand the general nature and operation of the control device at this point in the description of the camera. The preferred constructional details of the control device will be further described below in connection with Figs. 4–8 of the drawings. For the present, the description of the other parts of the camera will be continued.

The battery 32 supplies current not only to the motor 28 but also to the shutter release or triggering mechanism. This mechanism comprises an electromagnet 37 cooperating with a strong permanent magnet 38 attracting and normally holding an armature 40 connected as shown to an arm 9 on the shutter release shaft or trigger shaft 8. A spring 52 constantly tends to pull the armature away from the magnet 38 and to turn the shaft 8 in a shutter-releasing direction, but the permanent magnet 38 is strong enough to retain the armature 40 against the action of the spring 52 until the electromagnet 37 is energized sufficiently to release the armature, the magnetic force of the electromagnet being counter to that of the permanent magnet, so as to tend to neutralize the force of the permanent magnet.

The shutter release mechanism also includes the two switches 42 and 44 in series with each other and with the electromagnet 37, the capacitor 46 connected across the line (i.e., in parallel with the electromagnet) on the battery side of the switches 42 and 44, and the resistor 48 in series with the electromagnet between the battery and the capacitor. The switch 42 is normally closed and is opened by energizing the relay 50, which is connected across the mains which lead from the control device 30 to the motor 38. Thus whenever the control device is in a position to close the circuit to the motor 28, the relay 50 is likewise energized, the switch 42 is opened, and the circuit of the electromagnet 37 is broken or opened at this point. When the operation of the motor 28 turns the contact disk 35 of the control device 30 to a position which opens the electric circuit to the motor, the relay 50 is de-energized and the switch 42 goes to its normally closed position.

The switch 44 is normally open, and is closed by full movement of the manual plunger or pushbutton 34 to its fully actuated position. A partial movement of the pushbutton 34, to an intermediate position where some additional resistance is felt, is sufficient for actuating the changeover switch 33 to make the control device 30 effective, but is insufficient for closing the switch 44, which can be closed only by applying additional pressure to the pushbutton 34, to overcome the additional resistance and move it all the way.

The cam 12, as above mentioned, is driven by the shaft 15 in synchronism with the cocking or tensioning shaft 6 of the shutter. During the shutter tensioning movement, the rotation of the cam restores the armature 40 to its shutter latching position, close to or engaged with the permanent magnet. The cam comes to rest in a position which does not interfere with movement of the armature away from the magnet, when the shutter is released or triggered.

A typical cycle or sequence of operation of the camera will now be described. Let it be assumed that the camera is ready for taking a picture; that is, that the film 11 has been advanced, the shutter has been cocked or tensioned and has been latched in tensioned condition, the armature 40 has been placed against the magnet 38 by operation of the cam 12 and then has been released by the cam (i.e., the cam is out of the way of movement of the armature) and the release spring 52 has been tensioned. The switch 42 will be closed, the switch 44 will be open, and the capacitor 46 will be charged. The changeover coupling 24 and the changeover switch 26 will be in the positions illustrated in Fig. 1, i.e., with the motor shaft operatively connected to the shafts 25 and 4 and to the control disk 35 of the control device 30, and disconnected from the shafts 15, 6 and with the motor receiving power only by way of the control device 30, rather than directly from the battery 32. This is the normal or usual position of the parts, in this automatic camera, being the position in which all movement stops or ceases after taking a picture.

Now the operator points the camera toward the scene to be photographed, performs any necessary focusing and view-finding movements, and presses the release button or plunger 34. The first part of the movement of the button 34 serves to activate the control device 30, engaging the changeover switch contacts 33 with the arcuate contacts 36 on the disk 35, supplying current of the proper polarity to the motor 28, and simultaneously supplying current to the relay 50, so that the relay is activated and the switch 42 is opened. The motor, through the changeover coupling 24, turns the shutter shaft 4 and the disk 35 until the proper exposure value is set on the shutter. For this portion of the operation, it does not matter whether the button 34 has been depressed only to its intermediate point (sufficient to activate the control device 30 but not to close the switch 44) or whether it has been depressed all the way (closing the switch 44 also) because even if the switch 44 is closed, the switch 42 is opened as mentioned above, so that the exposure cannot be made until the operation of the motor 28 has adjusted the shutter to the proper exposure value. But this motor-driven adjustment of the exposure value takes place very rapidly, in less time than it takes to describe it.

When the motor has effected the exposure value setting and has disconnected itself (as will be more fully understood when we come to the detailed description of the control device in conjunction with Figs. 4–8 of the drawings) this also disconnects or de-energizes the relay 50, so that the switch 42 closes. If the pushbutton 34 has been depressed only to its intermediate position, insufficient to close the switch 44, the exposure still will not be made, because the shutter release circuit, although closed at the switch 42, will still be open at the switch 44. But if the pushbutton has previously been depressed all the way, closing the switch 44, it is seen that the closing of the switch 42 will complete the release circuit, allowing the energy stored in the capacitor 46 to discharge through the electromagnet 37, to counteract or neutralize the holding power of the permanent magnet 38 to a sufficient extent so that the spring 52 can pull the armature 40 away from the magnet assembly. This turns the release shaft 8 of the shutter, so that the shutter is now operated to make the exposure. Of course if the previous depression of the plunger 34 was only partial rather than complete, so that the exposure value was set but the exposure was not made, the depression of the plunger may be completed manually after any desired interval, and the exposure will then be made. In other words, the exposure will occur as soon as both of the switches 42 and 44 are closed, regardless of which one is closed first and which one is closed last.

Upon the running down of the shutter mechanism from tensioned position to rest position, during the making of the exposure, the shaft 6 turns in a direction opposite to the tensioning or cocking direction, carrying with it the driving disk 14. At the end of the running down motion, the disk 14 moves the shifter member 20 to move the changeover coupling 24 to its other or right hand position, disconnecting the motor from the shaft 4 and connecting it to the shaft 6. Simultaneously the connection 23 serves to move the changeover switch 26, so that the motor 28 is now connected to the battery 32 directly rather than through the control device 30. Hence the motor immediately begins to run. It turns the shaft 6 to tension or cock the shutter, turns the film transport device 10 to advance the film 11 through the space of one frame or exposure area, and turns the cam 12 to restore the armature 40 and the release shaft 8 to normal latching position. Of course the driving disk 14 turns at the same time. Near the end of the tensioning motion, the end of the slot 16 engages the claw 18, moving the shift member 20 so that just at the conclusion of the tensioning operation the changeover coupling 24 and changeover switch 26 are moved back to their respective left hand positions, thus completing the cycle to the initial position first described, and readying the parts for the next picture taking operation.

The construction provides automatic safety features which prevent undesired repetitive operation. If the operator keeps his finger pressure on the release button 34, this will keep the changeover switch 33 clamped fast in the zero or motor-stopping position, so that the motor will not start up again even though the changeover switch 26 has now connected the motor once more to the circuit passing through the control device. Moreover a second unintentional release of the shutter is not possible, even with the pushbutton 34 held fast, because both of the switches 42 and 44 are closed, and in this condition the capacitor 46 cannot build up a charge sufficient to release the shutter. On account of the resistor 48, the capacitor can charge only at a slow rate, so slow that with both switches 42 and 44 closed, the charging current immediately leaks off through the electromagnet 37, so slowly that it does not cause a release of the armature from the attraction of the permanent magnet 38.

It is seen that the camera is truly and completely automatic in every reasonable sense of the word. Some so-called automatic cameras are automatic only in setting the exposure value to the prevailing light conditions, but the operator is still required to perform manually the winding of the film and the tensioning or cocking of the shutter. Other cameras may be automatic in taking a sequence of exposures, at fixed intervals without opportunity for varying the intervals from picture to picture, and require manual adjustment of the exposure value. The present invention provides a still camera which is truly automatic in operation but fully under the manual control of the operator so far as the time of taking each individual exposure is concerned. Once the camera has been properly loaded with film, the further operation of the camera is entirely automatic until the film is used up. All that the operator has to do is to press the release button 34 when he points the camera to the desired scene. The exposure value is properly set to prevailing light conditions, the exposure is made, the film is advanced, and the shutter is tensioned or cocked ready for the next exposure, all without any further attention or effort on the part of the operator. Even after the operating cycle has been initiated by partial depression of the button 34, so as to set the exposure value, the operator still has an opportunity to change his mind and release the pushbutton 34 without making an exposure. If no exposure is made, the previous operation of the exposure value setting mechanism does not interfere with a new operation of the exposure value setting mechanism when it is again decided to make an exposure, if meanwhile the light conditions have changed.

Because only a single motor is used, the camera may be made relatively light, compact, and inexpensive. In the preferred construction, compactness is further achieved by placing the motor 28 at least partly inside the film winding spool, and by placing the battery 32 within the spool of the film supply cartridge or cassette.

Reference is now made to Figs. 4–7 of the drawings, showing constructional details of the control device indicated in general at 30 in Fig. 1. Referring to these Figs. 4–7, the device includes a photoelectric exposure meter 101 suitably mounted in any convenient location on the camera so as to receive light from the scene to be photographed, the exposure meter having a needle or pointer 102 movable in accordance with variations in the illumination or brightness of the scene to be photographed. This pointer 102 has a bent end 103 which engages in a radial slot 105 of the switch member 104 supported for rotation without substantial friction about a rotary axis which is parallel to the bent end 103 of the pointer 102, the switch member 104 being mounted also for limited axial movement in the direction of such rotary axis.

This switch member 104 corresponds to the switch member 33 in Fig. 1. It carries two contact bridges 106 and 107 angularly spaced from each other as best seen in Fig. 5. This rotary switch member can conveniently be made very light and in the form of a spider, having one radial arm containing the slot 105 for receiving the bent end 103 of the exposure meter pointer 102, another radial arm which carries the contact bridge 106, and a third radial arm which carries the contact bridge 107. Because of the compact and light construction, and of the fact that it is mounted on a very low-friction bearing, the rotary switch member 104 has extremely small inertia and it is easily turned to various positions by the swinging motion of the pointer 102 of the photoelectric exposure meter 101.

Rotatable on an axis coinciding with the axis of rotation of the member 104, is the rotary disk 111 corresponding to the rotary disk 35 in Fig. 1. This disk 111, on its face which is faced toward the member 104, carries three arcuate contact strips or conducting strips at three different radial distances from the axis of rotation. The innermost strip is indicated at 108, and the outermost strip at 110, both of these strips being continuous or unbroken throughout their circumferential lengths, although each strip occupies only a part of the entire circle. The intermediate contact strip (that is, the one at the intermediate radial distance, between the strips 108 and 110) may be referred to as a whole by the numeral 109, but is actually separated into three strips 109a, 109b, and 109c, circumferentially alined with each other but with small radial breaks or insulated areas between them.

Since the disk 111 in Figs. 4–7 corresponds to the disk 35 in Fig. 1, it will be apparent that this disk is to be driven by rotation of the motor, as already described in connection with Fig. 1. This is conveniently done by providing the disk 111 with gear teeth on part of its periphery, which gear teeth mesh with the teeth of an intermediate gear 112 driven, in turn, by the electric motor 28, corresponding to the electric motor 28 in Fig. 1. The changeover coupling 24 in Fig. 1 has been omitted in Figs. 4–7 for the sake of clarity, but it will be understood, of course, that the changeover coupling is actually present, and that the motor 28 drives the disk 111 only when the changeover coupling is in the appropriate position to establish the drive connection, as already fully explained in connection with Fig. 1.

Figure 7:
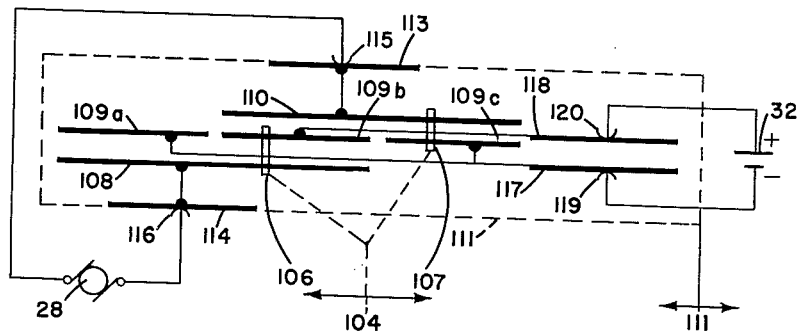
Fig. 7 is an electrical wiring diagram of the parts shown in Figs. 4–6.

On its lower face (that is, the face opposite to the one which carries the conducting strips 108, 109, and 110) the disk 111 carries two radially spaced arcuate conducting strips 113 and 114 (see Fig. 6) engaged respectively by stationary spring contacts 115 and 116 from which electrical conductors lead to the motor 28, as seen in Figs. 1, 4, and 7, with branch conductors also leading to the relay 50 as seen in Fig. 1. This lower or second face of the disk 111 also carries two other arcuate conductor strips 117 and 118, radially spaced from each other and from the previously mentioned strips 113 and 114, as well seen in Fig. 6. In all positions, these arcuate contact strips 117 and 118 are respectively engaged by stationary spring contact members 119 and 120, respectively connected to opposite sides of the battery 32, as seen in Figs. 1, 4, and 7.

All of the above mentioned arcuate conductive strips on the disk 111 are, of course, concentric with the axis of rotation of the disk. There are also various other conductive connections on the disk 111, which cannot be conveniently shown in Figs. 4–6, but which are shown in Fig. 7, as follows: The arcuate conductor or strip 113 is electrically connected to the strip 110. The strip 114 is electrically connected to the strip 108. The strip 117 is electrically connected to both of the strips 109a and 109c, but not to the strip 109b. The strip 118 is electrically connected to the strip 109b.

These various arcuate strips and some or all of the electrical connections between them are preferably formed on the disk 111 by well known "printed circuit" technique.

By means of a suitable pressing member 123 movable in an axial direction (that is, in the direction of the common axis of rotation of the members 104 and 111) the member 104 can be moved axially toward the disk 111 until the contact bridge members 106 and 107, normally separated from the contact strips on the disk, make electrical contact therewith. When the member 104 is pressed axially in this way, the contact bridge member 106 will make an electrical connection between the strip 108 and that part of the strip 109 (i.e., parts 109a, 109b, or 109c) which happens to be opposite the member 106 at that instant, and the other contact bridge member 107 will make electrical contact between the strip 110 and that part of the strip 109 which happens to be opposite the member 107. The axial pressing member 123 corresponds to the connection diagrammatically shown in Fig. 1 between the button 34 and the member 33.

From the detailed electrical connections which have now been explained in conjunction with Figs. 4–7 (which connections are shown only in general at 36 in Fig. 1) and from what has been said above about the general operation of the control device 30, it is thought that a clear understanding of the operation of the control device will now be easily possible. It has already been mentioned that the direction in which the motor 28 is driven (during the exposure value setting operation) depends on the relative orientation of the rotary switch member 33 (or 104) and the rotary disk 35 (or 111). It has already been explained that the rotary position of the disk 35 (or 111) corresponds to the exposure value for which the shutter is set, since the disk 35 is permanently connected by the shaft 25 to the exposure value setting shaft 4 of the shutter, and any change in the position of one must be accompanied by a corresponding change in the position of the other. It is now apparent also that the rotary position of the switch member 33 (or 104) is determined by the photoelectric light meter 101, by reason of the engagement of the end 103 of the meter pointer 102 in the slot 105 of the member 104. The arcuate lengths of the segments 109a, 109b, and 109c of the strip 109 are so designed, with relation to the angular spacing between the contact bridges 106 and 107, and are so correlated, that when the exposure value setting shaft 4 of the shutter is set at an exposure value corresponding to the indication of the exposure meter 101, the contact bridge 106 will be alined with the gap or insulated space between the conducting segments 109a and 109b, and simultaneously the other conducting bridge 107 will be alined with the gap or insulating space between the segments 109b and 109c. No current will then flow to the motor 28.

But in any other position of relative orientation of the parts (that is, when the exposure value setting of the shaft 4 does not correspond with the exposure value indication of the motor 101) current will be supplied through the control device to the motor, to operate the motor in one direction or the other until the parts are brought to the position of relative orientation above mentioned, where current to the motor is cut off. Thus, for example, if the parts are in the position of relative orientation indicated in Fig. 5, at the time that the pushbutton 34 is depressed to move the member 33 (or 104) axially against the disk 35 (or 111) then the contact bridge 106 will make contact with and establish electrical connection between the arcuate conductors 108 and 109a, and simultaneously the contact bridge 107 will make contact with and establish electrical connection between the arcuate conductors 109b and 110. Following now the wiring diagram in Fig. 7, it will be seen that current from the plus side of the battery 32 (which is permanently connected to the contact strip 118 by means of the sliding spring contact 120) will flow from the strip 118 to the segment 109b, thence through the contact bridge 107 (when it is in the position shown in Fig. 5, not the position shown in Fig. 7) from the segment 109b to the segment 110, thence from the segment 110 to the strip 113, and from the strip 113 to the first side of the motor 28. Similarly, from the negative side of the battery, the current connection will be successively through the strips 117 and 109a, through the conducting bridge 106, through the strips 108 and 114, to the second side of the motor 28. This will operate the motor 28 in a direction to turn the disk 110 counterclockwise when viewed as in Fig. 5 (the switch member 104 meanwhile being clamped fast and held against rotation) and will cause the strips 108, 109, and 110 to be dragged along under the stationary resilient bridge members 106, 107, while remaining in electrical contact therewith, until the rotation of the disk brings the insulated gap between the segments 109b and 109c around to the bridge member 107, and the insulated gap between the segments 109a and 109b around to the bridge member 106. When this point is reached, the current will be cut off, the motor will stop, and the exposure value setting shaft 104 will have been brought around to an exposure value setting corresponding to the indication of the meter 101.

Let us suppose now that at the time the pushbutton 34 is depressed, to bring the switch member 33 (or 104) down against the disk 35 (or 111), the parts are not in the relative position of orientation shown in Fig. 5, but are in an opposite position, with the respective bridges 106 and 107 on the opposite sides of the gaps in the conducting segments 109. Such an opposite position is indicated in the wiring diagram, Fig. 7. Current from the plus side of the battery 32 will now go to the second side of the motor 28 rather than to the first side thereof, the connection being through the parts 120, 118, 109b, 108, and 114. The minus side of the battery 32 will be connected to the first side of the motor, through the parts 119, 117, 109c, 107, 110, and 113, to the first side of the motor, which therefore will run in the opposite direction from the direction of rotation previously described in the earlier example. This will rotate the disk 35 (or 111) in the opposite direction, relative to the switch member 33 (or 104) which is now clamped in stationary position, until the parts once more reach the zero position of relative orientation, where the bridge members 106 and 107 are at the insulated gaps between the respective conducting segments 109a, 109b, and 109c, at which zero point the motor will stop, having set the exposure value setting shaft 4 at the proper exposure value indicated by the exposure meter 101.

It will be noted that during the actuation of the pushbutton 34 and the connection 123 to clamp the rotary switch member 33 (or 104) the axial movement of this rotary switch member is in the same direction as the axially bent end 103 of the pointer 102 of the meter 101. Hence the clamping of the switch member into its electrically operative position does not tend to move the pointer 102 and does not place any strain or force whatever on the delicate meter parts, which do not have to withstand any clamping force, as they do in some other forms of exposure value setting mechanism.

Figure 8:
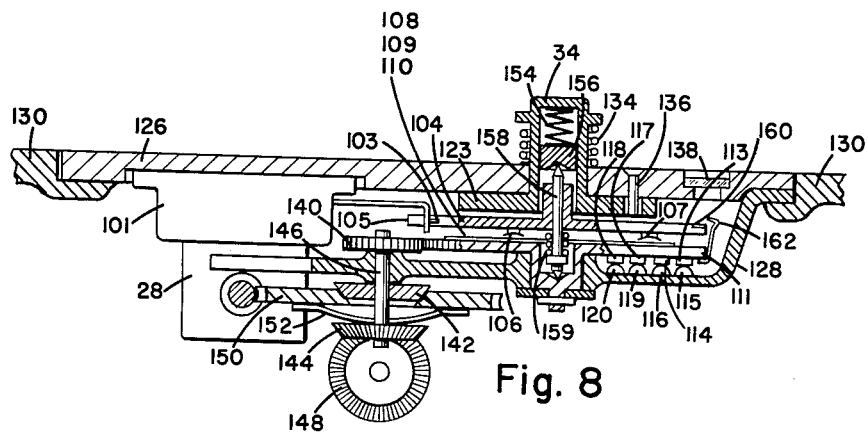
Fig. 8 is a vertical section taken longitudinally through one practical form of the mechanism illustrated diagrammatically in Figs. 4–7.

Referring now to Fig. 8, there is shown a specific embodiment of the control device in a self-contained or single unit form, ready for installation in a camera. Many of the electrical contacts and connections, as well as fastening screws and other obvious mechanical parts, are omitted from Fig. 8 for the sake of clarity, but will be readily understood by those skilled in the art.

In this specific embodiment of Fig. 8, the control device forms a self-contained or almost entirely self-contained unit mounted on a cover plate 125 which, together with a bridge-like supporting member 128 connected to the cover plate, fits in and serves as a closure for an appropriate opening in an outer wall of the camera body or casing or housing fragmentarily indicated at 130. The galvanometer portion 101 of the photoelectric exposure meter is fitted to and carried by the inner face of the cover plate 126.

The driving motor 28 is secured to and supported from the galvanometer housing 101, and the motor is surrounded by the left forked end of the support 128 which is secured firmly to the motor housing, so that the galvanometer and motor housings together form a rigid support for this portion of the bridge 128.

The pressure member 123 is supported in an axially displaceable manner, with a hollow stem extending through an appropriate opening in the cover plate 126. The outer end of this hollow stem is indicated by the numeral 34, corresponding to the pushbutton 34 in Fig. 1. The coil spring 134 surrounding the stem and bearing against a flange on the stem, tends to move the pressure member 123 upwardly. A pin 136 fixed to the cover plate 126 engages an opening in the pressure member 123 to hold the latter against rotation while permitting it to move axially. In a position radially beyond the periphery of the pressure member 123, there is an observation window 138 for observing certain markings on the control parts, as will be further explained below.

The disk 111 has a stem rotatably received in the central bore in the pressure member 123, and this disk carries the arcuate electrical conductors as previously described. The gear teeth formed on part of the periphery of the disk 111 mesh with the pinion 140 fixed to a shaft 146, on which a friction drive wheel 142 is also fixed, the shaft being supported in a bearing in the bridge member 128. This shaft 146 also has fixed to it a bevel gear 144 meshing with another bevel gear 148 which is part of the drive going to the exposure value setting shaft 4 of the shutter.

The friction drive member 142 has a conical periphery, on which is seated a conical recess in a worm gear 150 pressed frictionally onto the member 142 by a spring 152. This provides a friction drive between the worm gear 150 and the shaft 146, which friction drive provides enough power to drive the parts during normal operation, but it can be easily overcome, when desired, by the hand drive of the exposure value setting mechanism, if it is desired to override the automatic exposure value setting mechanism and to set the exposure value by hand, to a value contrary to that indicated by the automatic mechanism. The worm gear 150 is driven by a worm rotated in any suitable manner by the motor 28. The changeover coupling 24, not shown in Fig. 8, but shown diagrammatically in Fig. 1, will normally be interposed in an operative position between the motor 28 and the worm gear 150. But of course the worm which meshes with the worm gear 150 can be directly placed on the armature shaft of the motor, just as shown in Fig. 8, and the changeover coupling 24 can be omitted, if it is desired to use this part of the structure (Fig. 8 and associated parts) just for automatic setting of exposure value, without utilizing the rest of the present invention to accomplish automatic film advance and shutter tensioning.

The rotary switch member 104, operated by the end 103 of the galvanometer 101 of the exposure meter and carrying the contact bridge members 106 and 107, is mounted on a small shaft 158 with pointed ends to provide a very low friction bearing. The lower pointed end engages in a conical socket formed in a central bore or depression in the disk 111 as shown, while the upper pointed end of the shaft 158 engages in a conical depression in the sliding block 156 axially movable within the central bore of the pressure member 123 and pressed downwardly to keep it properly engaged with the end of the shaft 158 by means of a coil spring 154. The disk 111, in turn, has its bearing on the bridge member 128, and such bearing may be in the form of an elastic bearing as well known in the construction of measuring instruments, if desired. The rotary switch member 104 is supported on its shaft 158 in such manner that it can move longitudinally thereon and also rotate thereon (although its shaft 158 can also rotate with low friction on its pointed ends, as above mentioned) and a coil spring 159 surrounding the shaft 158 below the member 104 tends to lift the member 104 upwardly away from the disk 111.

The rotary switch member 104 carries at one point a mark 160 which can be seen through the observation window 138 above mentioned, this window being elongated in an arcuate direction (concentric with the shaft 158) to a sufficient extent so that the mark 160 can be seen through the window throughout the entire range of rotary movement of the switch member 104 as caused by the swinging of the end 103 of the pointer of the galvanometer 101. The rotary disk 111 also carries a mark such as the upstanding pointer 162 which can likewise be seen through the same observation window 138, this mark being so related to the mark 160 that when the two marks are opposite each other, the members 104 and 111 are in the zero position of orientation relative to each other, with the exposure value of the shutter set to the same value indicated by the exposure meter. In this way, the exposure value may be manually set on the shutter, in accordance with the indications of the meter, in case there is any failure of the motor drive of the exposure value mechanism.

With this arrangement as illustrated in Fig. 8, it is seen that the exposure value control is in the form of a unit which can be readily attached to and detached from any camera equipped with an appropriate opening to receive the cover member 126 of the detachable unit. If the bevel gear 148 and its shaft are permanently mounted in the camera housing, it is seen that the bevel gears 144 and 148 constitute a detachable coupling which can break or open at this point when the unit is detached from the camera. Or again, the bevel gear 148 can constitute part of the detachable unit, and there can be any suitable known form of detachable coupling for operatively connecting the bevel gear 148 to the exposure value setting shaft 4 on the shutter of the camera. It thus becomes possible to manufacture and deliver a camera without the automatic mechanism for setting the exposure value, but with a space in the camera housing 130 for receiving the exposure value setting unit (which space can be covered by a blank plate) and then the unit for automatically setting the exposure value can be purchased separately as an accessory, and can be quickly applied to the camera whenever desired.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera comprising a film advancing member, a shutter, a shutter tensioning member movable in a first direction to tension the shutter ready for an exposure and movable reversely in a second direction during the making of an exposure, an exposure value setting member, a single electric motor, shiftable coupling means effective in a first position to connect said motor operatively to said film advancing member and shutter tensioning member while disconnecting it operatively from said exposure value setting member and effective in a second position to connect said motor operatively to said exposure value setting member while disconnecting it operatively from said film advancing member and said shutter tensioning member, and shifting mechanism operatively connected to and moving with said shutter tensioning member for shifting said coupling means from its first position to its second position substantially at the completion of movement of said shutter tensioning member in said first direction and shifting said coupling means back from its second position to its first position substantially at the completion of movement of said shutter tensioning member in said second direction.

2. A photographic camera comprising a film advancing member, a shutter, a shutter tensioning member movable in a first direction to tension the shutter ready for an exposure and movable reversely in a second direction during the making of an exposure, an exposure value setting member, a single electric motor, shiftable coupling means effective in a first position to connect said motor operatively to said film advancing member and shutter tensioning member while disconnecting it operatively from said exposure value setting member and effective in a second position to connect said motor operatively to said exposure value setting member while disconnecting it operatively from said film advancing member and said shutter tensioning member, a polarized source of electric power, a photoelectric exposure meter, a pole-changing electric control device under the influence of said exposure meter, and a shiftable electric switch operatively connected to said shiftable coupling means for connecting said motor directly to said source of power uninfluenced by said control device when said shiftable coupling means is in its said first position and for connecting said motor indirectly to said source of power only through and under the influence of said control device when said shiftable coupling means is in its said second position.

References Cited in the file of this patent

UNITED STATES PATENTS

| | | |
|---|---|---|
| 2,227,240 | Becker | Dec. 31, 1940 |
| 2,518,717 | Rath | Aug. 15, 1950 |
| 2,578,254 | Lee | Dec. 11, 1951 |
| 2,780,971 | Fahlenberg | Feb. 12, 1957 |
| 2,836,109 | Mamiya | May 27, 1958 |
| 2,839,976 | Mamiya | June 24, 1958 |
| 2,913,969 | Faulhaber | Nov. 29, 1959 |